United States Patent [19]
Benoit et al.

[11] Patent Number: 5,921,510
[45] Date of Patent: Jul. 13, 1999

[54] CABLE TIE WITH CHRISTMAS TREE FASTENER

[75] Inventors: James C. Benoit, Needham; Clinton Noddin Matthews, Stoughton, both of Mass.

[73] Assignee: Avery Dennison Corp., Pasadena, Calif.

[21] Appl. No.: 08/753,156

[22] Filed: Nov. 21, 1996

[51] Int. Cl.$^6$ ................................................. F16B 15/00
[52] U.S. Cl. ........................ 248/71; 248/74.3; 248/68.1
[58] Field of Search ........................ 248/68.1, 71, 74.3, 248/74.2, 74.4, 69; 24/17 AP, 453, 16 PB; 411/508, 509, 510, 913

[56] References Cited

U.S. PATENT DOCUMENTS

| | | | |
|---|---|---|---|
| 2,909,957 | 10/1959 | Rapata | 411/508 |
| 2,969,216 | 1/1961 | Hallsey | 248/71 |
| 3,157,377 | 11/1964 | Orenick | 248/71 |
| 3,452,318 | 6/1969 | Tanges | 439/420 |
| 3,465,992 | 9/1969 | Schuplin | 248/71 |
| 3,653,096 | 4/1972 | Fernberg | 24/16 PB |
| 4,342,438 | 8/1982 | Speedie | 248/73 |
| 4,396,329 | 8/1983 | Wollar | 411/508 |
| 4,509,710 | 4/1985 | Cooper et al. | 248/73 |
| 4,865,281 | 9/1989 | Wollar | 248/71 |
| 5,131,613 | 7/1992 | Kamiya et al. | 248/74.3 |
| 5,333,822 | 8/1994 | Benoit et al. | 248/71 |
| 5,337,983 | 8/1994 | Mailey | 248/74.3 |
| 5,368,261 | 11/1994 | Caveney et al. | 248/73 |
| 5,385,321 | 1/1995 | Kume et al. | 248/74.3 |
| 5,505,411 | 4/1996 | Heaton et al. | 248/70 |

*Primary Examiner*—Ramon O. Ramirez
*Assistant Examiner*—Gwendolyn Baxter
*Attorney, Agent, or Firm*—Kriegsman & Kriegsman

[57] ABSTRACT

A one-piece cable tie for securing a cable to mounting surface having an aperture therein. The cable tie comprises an elongated strap and a locking head integrally formed together. The locking head is adapted to cooperate with the strap to form a loop around the cable. The cable tie further comprises a fastener coupled to the locking head in coaxial alignment with the longitudinal axis of the strap. The fastener includes a flange and a Christmas tree head adapted to be inserted in the aperture of the mounting surface. The Christmas tree head includes a pair of legs integrally formed on and projecting out from the underside of the flange which terminate in a common tip. The pair of legs are capable of being inwardly compressed upon insertion of the Christmas tree head into the aperture. The flange, the legs and the tip together define a longitudinal slot therebetween. Each of the pair of legs includes an integrally formed rib which protrudes into the elongated slot and which serves to limit the amount of inward compressibility of the legs. Each of the pair of legs further includes a plurality of flexible flutes which extend radially outward from along the length of each leg, the flutes engaging the mounting surface so as to frictionally and releasably secure the fastener to the mounting surface. In another embodiment of the present invention, the fastener is coupled to the strap perpendicular with the longitudinal axis of the strap.

19 Claims, 10 Drawing Sheets

CABLE TIE WITH CHRISTMAS TREE FASTENER

BACKGROUND OF THE INVENTION

The present invention relates generally to cable ties, and more specifically to a cable tie which includes a Christmas tree fastener.

Cable ties are well known in the art and are used in a variety of applications such as securing a cable to a mounting structure.

When used for securing a cable to a mounting structure, cable ties often include a fastener, an elongated strap and a locking head integrally connected to one end of the strap. In use, the free end of the strap is inserted into a channel in the locking head to form a loop around the cable, wherein increased insertion of the free end of the strap into the locking head decreases the size of the loop. The cable tie is locked into place around the cable by a locking tang or pawl located within the locking head which engages teeth or cross-bars formed on the strap. The fastener is then used to secure the cable to the mounting surface.

One type of fastener used in cable ties is sized and shaped to be inserted through an aperture in the mounting surface.

In U.S. Pat. No. 5,333,822 to James C. Benoit and Charles L. Deschenes, which patent is incorporated herein by reference, there is disclosed a locator tie for attaching an element, such as a bundle of electrical wires, to a thin wall having an aperture. The locator tie is made of plastic and comprises a cable tie capable of surrounding and engaging the element and a fastener integrally formed with the cable tie, the fastener being adapted so that it can be easily inserted into the aperture but removed from the aperture only with great difficulty. The fastener includes an arrowhead mounted on a support and surrounded by a spring-biased basket. The cable tie includes a strap having a head portion which is on one side of the fastener and a tail portion which is on the other side of the fastener. The head portion includes an engagement head and the tail portion includes an engagement surface, which, when fed through the engagement head is locked in the engagement head and cannot thereafter be extracted. The strap also includes a pair of holding blocks, one on the head portion of the strap and the other on the tail portion of the strap for engaging a corrugated socket which surrounds the bundle of wire.

It is also well known in the art for cable ties to comprise a fastener generally in the shape of a pine-tree or a Christmas tree which is sized and shaped to be inserted through an aperture in a mounting surface. These fasteners are widely used in the art due to the low insertion force required to insert the fastener through the aperture of the mounting surface and due to the high extraction force required to extract the fastener from the aperture of the mounting surface.

For example, in U.S. Pat. No. 4,342,438 to R. Speedie there is disclosed a unitary plastic material cable strap fastener having a flange with a plug member on one side for engaging in a hole in a panel to hold the fastener in position. The plug includes a stem with a head at its end and rows of radial wings arranged along its length. A stud extends from the opposite side of the flange coaxial with the plug. A flexible strap member is attached to the flange by a bifurcated end having a pair of legs formed by an opening in the strap end. The strap extends from the flange in the same direction as the stud with the stud extending into the opening with the legs straddling the stud. The strap is provided with a series of stud receiving openings for engaging the stud when the strap is formed into a loop. The flexible legs of the strap permit the strap to be rotated or folded relative to the longitudinal axis of the plug and stud so that it extends perpendicular thereto to permit the stud receiving openings to engage the stud.

One drawback of pine-tree shaped fasteners of the type described above is that such a fastener is adapted to be inserted through apertures of a particularly narrow range. In particular, if the diameter of the aperture in the mounting surface is slightly smaller than the diameter of the fastener, either the user will not be able to insert the fastener through the aperture or the user will require an extremely high insertion force be able to insert the fastener through the aperture, which is undesirable.

SUMMARY OF THE INVENTION

It is an object of this invention to provide a new and improved cable tie.

It is another object of this invention to provide a cable tie as described above for securing a cable to a mounting surface.

It is yet another object of this invention to provide a cable tie of the type described above which includes a fastener which can be inserted into an opening in the mounting surface.

It is still another object of this invention to provide a cable tie of the type described above wherein the fastener is generally in the shape of a Christmas tree.

It is yet another object of this invention to provide a cable tie of the type described above which can be inserted through a large range of aperture sizes.

It is still another object of this invention to provide a cable tie of the type described above which requires a very low insertion force to insert the fastener through the aperture of the mounting surface.

It is yet still another object of this invention to provide a cable tie of the type described above which requires a very high extraction force to extract the fastener from the aperture of the mounting surface.

In one embodiment of the present invention, there is provided a cable tie for securing a cable to a mounting surface having an aperture therein, said cable tie comprising an elongated strap having a first end, a second end and a longitudinal axis, a locking head integrally formed to the first end of said elongated strap, said locking head being adapted to cooperate with said strap to form a loop around the cable, and a fastener coupled to said locking head for securing said cable to the mounting surface, said fastener comprising a flange having a top side and a underside, and a Christmas tree head adapted to be inserted in the aperture of the mounting surface, said Christmas tree head including a pair of legs integrally formed on and projecting out from the underside of said flange, said legs terminating to form a common tip, said legs being inwardly compressible upon insertion of said Christmas tree head into the aperture, said flange, said legs and said tip together defining a longitudinal slot therebetween, wherein each of said pair of legs includes an integrally formed rib which protrudes into the elongated slot, said ribs serving to limit the amount of inward compressibility of said legs.

In another embodiment of the present invention, there is provided a cable tie for securing a cable to a mounting surface having an aperture therein, said cable tie comprising an elongated strap having a first end, a second end and a longitudinal axis, a locking head integrally formed to the first end of said elongated strap, said locking head being adapted to cooperate with said strap to form a loop around the cable, and a fastener coupled to said strap for securing the cable to the mounting surface, said fastener comprising a flange having a top side and a underside, and a Christmas tree head adapted to be inserted in the aperture of the mounting surface, said Christmas tree head including a pair of legs integrally formed on and projecting out from the underside of said flange, said legs terminating to form a common tip, said legs being inwardly compressible upon insertion of said Christmas tree head into the aperture, said flange, said legs and said tip together defining a longitudinal slot therebetween, wherein each of said pair of legs includes an integrally formed rib which protrudes into the elongated slot, said ribs serving to limit the amount of inward compressibility of said legs.

Various other features and advantages will appear from the description to follow. In the description, reference is made to the accompanying drawings which form a part thereof, and in which is shown by way of illustration, specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF THE PREFERRED EMBODIMENT

Referring now to the drawings, there are shown in FIGS. 1–9 a first embodiment of a cable tie constructed according to the teachings of the present invention, the cable tie being identified by reference numeral 11.

As will described in detail below, cable tie 11 can be used in a conventional manner to secure a cable to a mounting surface, such as a thin wall, having an aperture, the cable comprising a plurality of wires surrounded by a tubular sheath having longitudinally spaced apart annular grooves on its outer surface.

Cable tie 11 is an integrally formed structure made of a flexible, resilient material such as plastic, nylon or a high modulus elastomer and can be manufactured through conventional injection molding techniques. Cable tie 11 comprises an elongated strap 13, a locking head 15 and a fastener 17.

Figure 1:
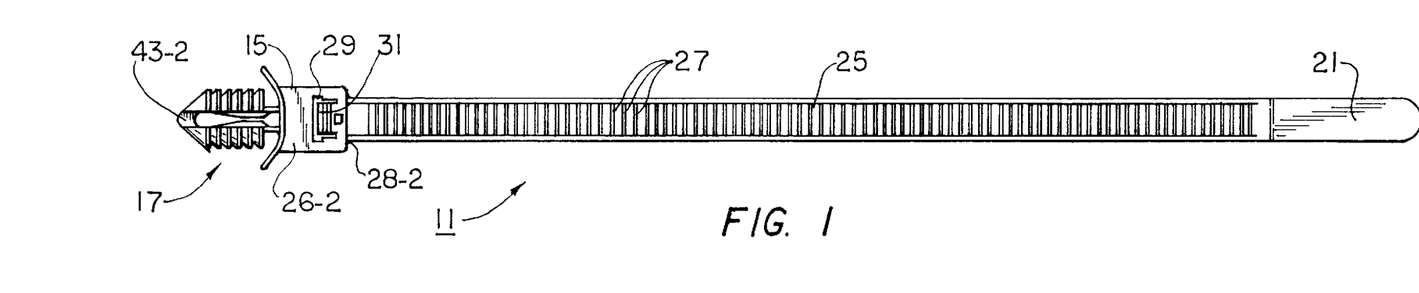
FIG. 1 is a bottom view of a first embodiment of a cable tie constructed according to the teachings of the present invention.
Figure 2:
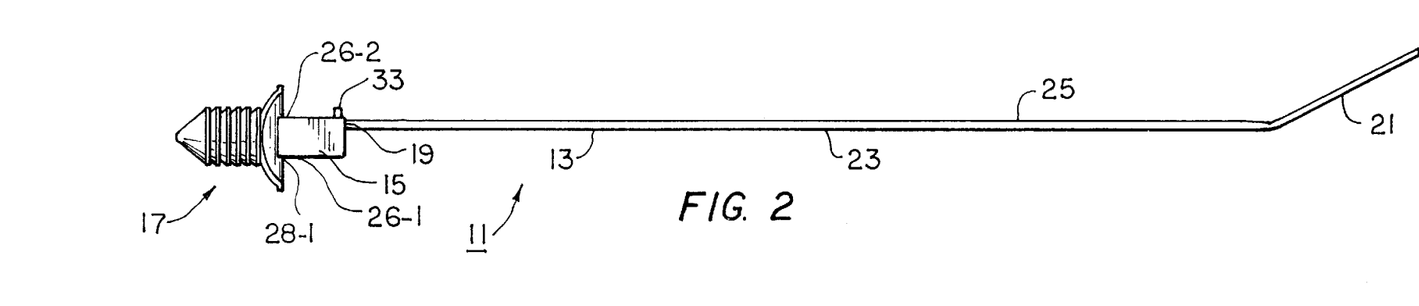
FIG. 2 is a view of the cable tie shown in FIG. 1.
Figure 3:
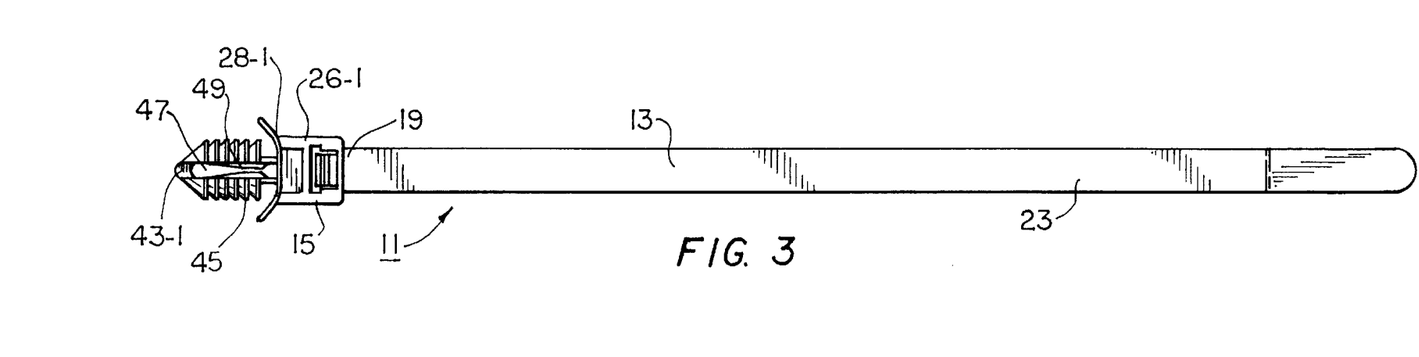
FIG. 3 is a view of the cable tie shown in FIG. 1.

Elongated strap 13 includes a first end 19, a second end 21, a top planar surface 23 and a bottom surface 25. Strap 13 further includes a plurality of ratchet-shaped teeth 27 spaced along the length of bottom surface 25.

Locking head 15 includes a top surface 26-1, a bottom surface 26-2, an outer end wall 28-1, an inner end wall 28-2, a strap accepting channel 29 which extends through head 15 from top surface 26-1 to bottom surface 26-2, a locking pawl 31 and a rib 33 on surface 26-1 which is intended to engage the cable and prevent movement of the cable relative to tie 11. Inner end wall 28-2 of locking head 15 is integrally formed to first end 19 of elongated strap 13.

Fastener 17 is integrally formed to outer end wall 28-1 of locking head 15 in co-axial alignment with the longitudinal axis of strap 13. Fastener 17 is sized and shaped to be insertable into and through the aperture of a mounting surface, thereby securing the cable to the mounting surface, as will be discussed further below. Fastener 17 comprises a dished-shaped flange 35 integrally formed to outer end wall 28-1 of locking head 15 and a Christmas tree shaped head 37 which extends radially inward from the concave underside of flange 35.

Figure 4:
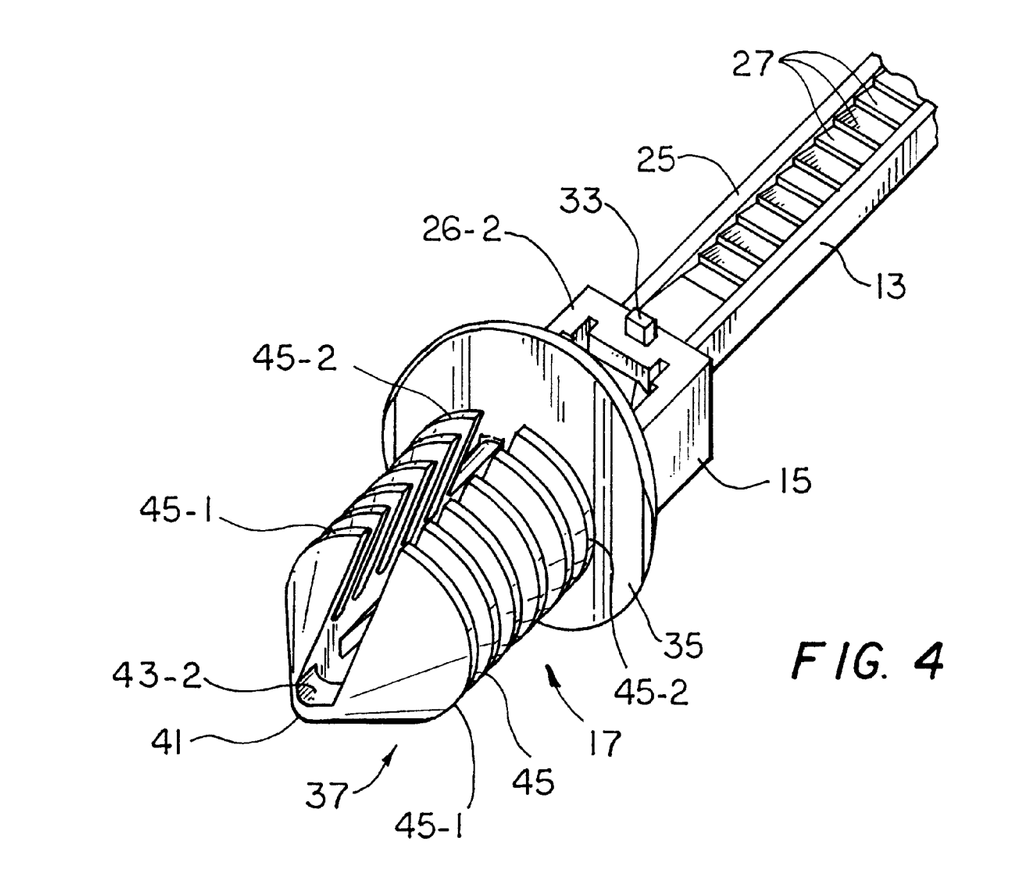
FIG. 4 is an enlarged, fragmentary perspective view of the cable tie shown in FIG. 1.
Figure 5:
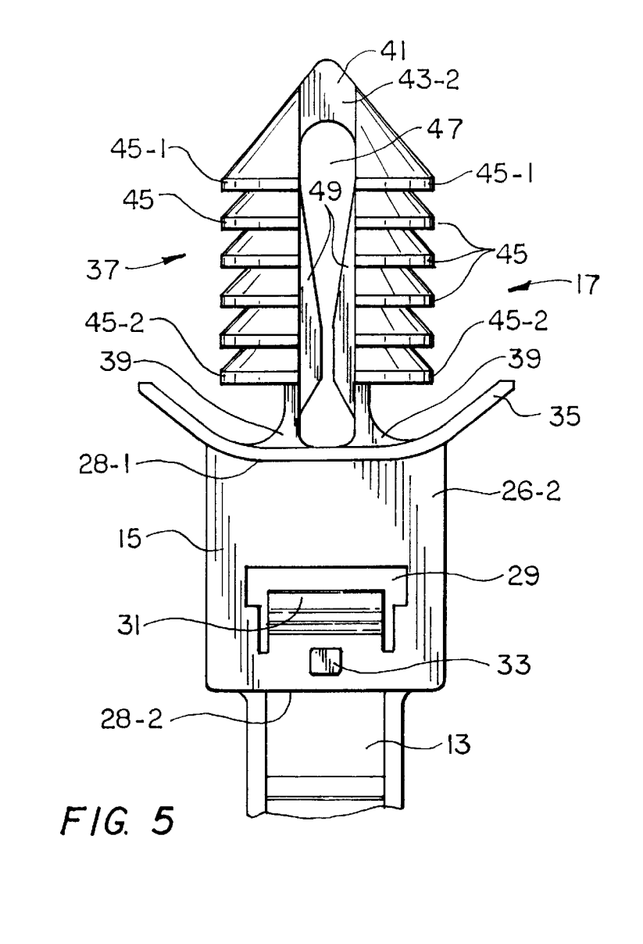
FIG. 5 is an enlarged, fragmentary view of the cable tie shown in FIG. 1.

Christmas tree shaped head 37 includes a pair of spaced apart, parallel legs 39 which are equidistant from a centerpoint on flange 35. Parallel legs 39 extend radially inward from the concave underside of flange 35 and terminate in a common tip 41. Tip 41 is sized and shaped to include a flat top surface 43-1 and a flat bottom surface 43-2, surfaces 43-1 and 43-2 being of a size adequate enough to serve as a surface on which a push pin can eject cable tie 11 from a manufacturing mold.

Each leg 39 of head 37 includes a plurality of retention barbs or flutes 45 formed as semi-circular, upwardly angled, disc protrusions on the non-opposing sides of legs 39. Flutes 45 are constructed of a long length and are configured to distort or collapse in a direction towards legs 39 during insertion of head 37 into aperture A. The inward collapse of flutes 45 decreases the amount of force required to insert head 37 into aperture A, which is highly desirable. Due to its resilient construction, flutes 45 return to its original position after insertion to prevent the release of head 37 from wall W. As a consequence of its resiliency, flutes 45 additionally serve to increase the amount of force required to extract head 37 from aperture A, which is also highly desirable.

Figure 6:
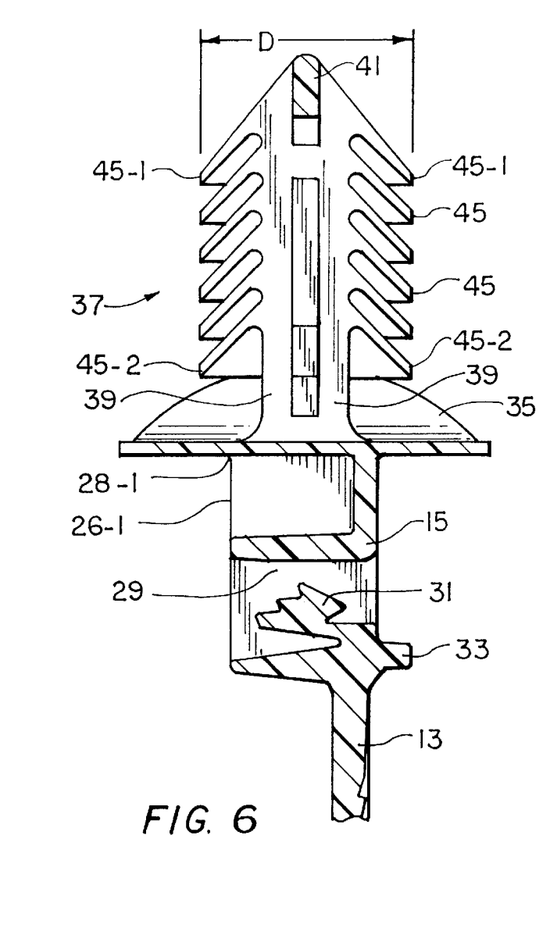
FIG. 6 is an enlarged, fragmentary sectional view of the cable tie shown in FIG. 2.

As can be seen in FIG. 6, the length of each flute 45 is considerably longer when compared to the length of flutes in prior art Christmas tree fasteners. Specifically, the diameter D of head 37 is in the range of approximately 0.34 inches to 0.35 inches whereas the diameter of prior art Christmas tree heads are in the range of approximately 0.28 to 0.30 inches. The increased length of flutes 45 serves to increase the overall size and diameter of Christmas tree head 37, thereby enabling fastener 17 to be used with substantially larger sized apertures. The increased length of flutes 45 also serves to increase the amount of force required to extract head 37 from aperture A, as desired.

Furthermore, it should be noted that the cross-section of each flute 45 is largest at the junction of each flute 45 with its associated leg 39. The thicker cross-section of each flute 45 at its junction with its associated leg 39 serves to strengthen the connection of flutes 45 with legs 39 and thereby resist disconnection of flute 45 from its associated leg 39. In addition, the thicker cross-section of each flute 45 at its junction with its associated leg 39 serves to increase the force required to bend flutes 45 away from its associated leg 39, thereby increasing the extraction force required to remove head 37 from aperture A, as desired.

As can be seen in FIG. 5, flange 35, legs 39 and tip 41 together define an elongated longitudinal slot 47 therebetween. Longitudinal slot 47 enables for resilient legs 39 to be compressed significantly inward towards one another with relatively little force, the inward compression causing the overall size of head 37 to be reduced. As a result, the ability to reduce the overall size of head 37 significantly decreases the amount of force required to insert fastener 17 in aperture A, as desired. Furthermore, the ability to reduce the overall size of head 37 enables fastener 17 to be used with substantially smaller sized apertures, thereby increasing the range of potential applications of tie 11.

However, as can be appreciated, the inward compression of legs 39 places a high level of stress on legs 39 at its junction with flange 35. As a consequence, when a large amount of force is used to compress legs 39 towards one another, very often legs 39 will break or snap at its junction with flange 35, rendering the fastener useless.

Accordingly, each of legs 39 includes an integrally formed tapered rib 49 which protrudes into elongated slot 47. Tapered ribs 49 serve to limit the amount of inward compression of legs 39, thereby preventing legs 39 from breaking off at its junction with flange 35.

Each one of ribs 49 is shaped to taper slightly inward from the pair of upwardmost flutes 45-1, which are closest to tip 41, down towards the pair of lowermost flutes 45-2, which are closest to flange 35. Ribs 49 then taper quickly back into legs 39 from lowermost flutes 45-2 down towards flange 35. The particular cross-section of ribs 49 enables head 37 to compress significantly inward towards tip 41, thereby decreasing the force required to initially insert head 37 into aperture A. In addition, the particular cross-section of ribs 49 significantly limits the inward compression of head 37 towards flange 35, thereby increasing the force required to initially extract head 37 from aperture A.

Figures 7, 8:
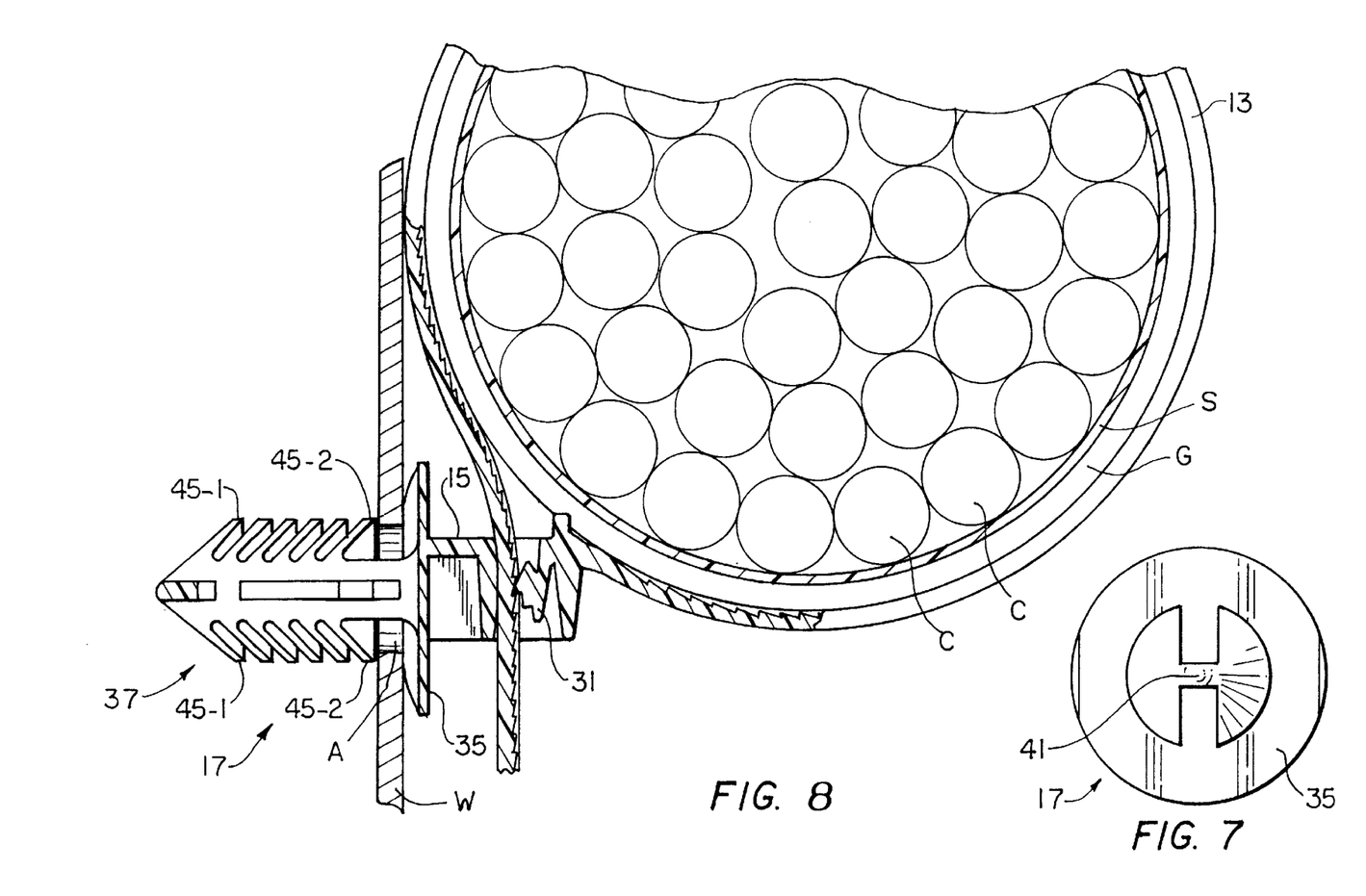
FIG. 7 is an enlarged left end view of the cable tie shown in FIG. 2.
FIG. 8 is a fragmentary section view of the cable tie shown in FIG. 2, the cable tie being shown securing a cable having a plurality of wires enclosed within a convoluted tubular sheath and inserted through an aperture in a thin wall.
Figure 9:
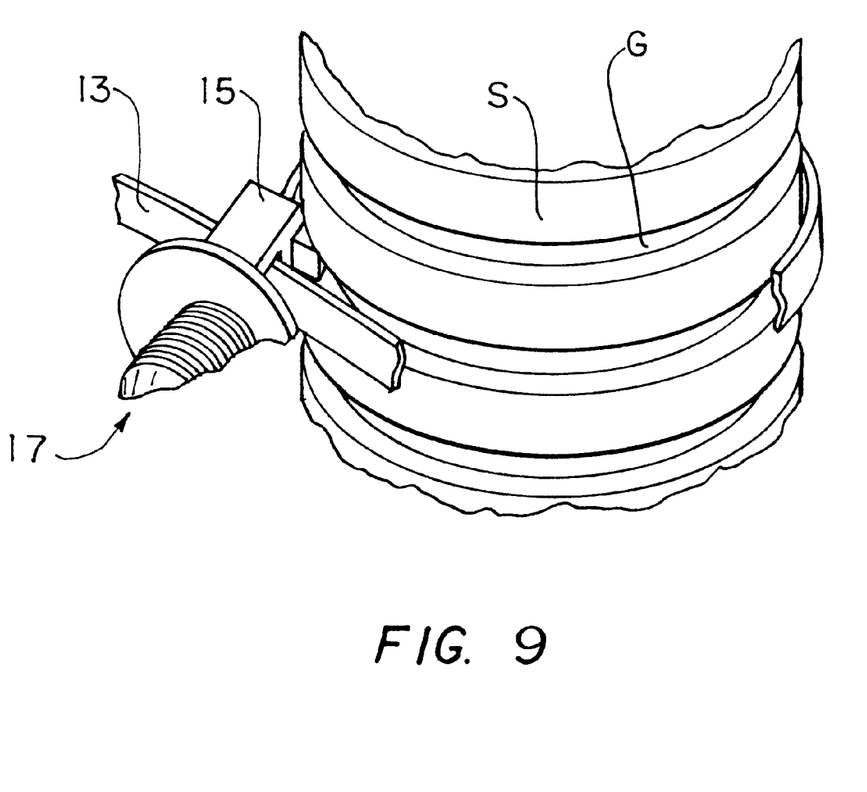
FIG. 9 is a fragmentary perspective view of the cable tie shown in FIG. 8.
Figure 10:
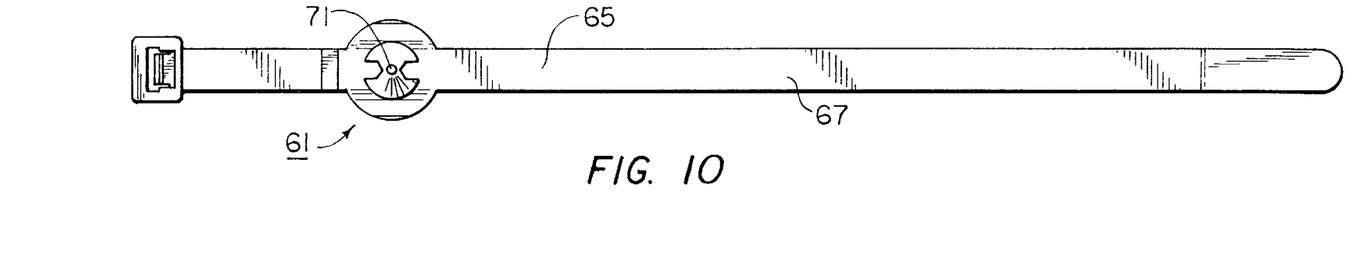
FIG. 10 is a top view of a second embodiment of a cable tie constructed according to the teachings of the present invention.
Figure 11:
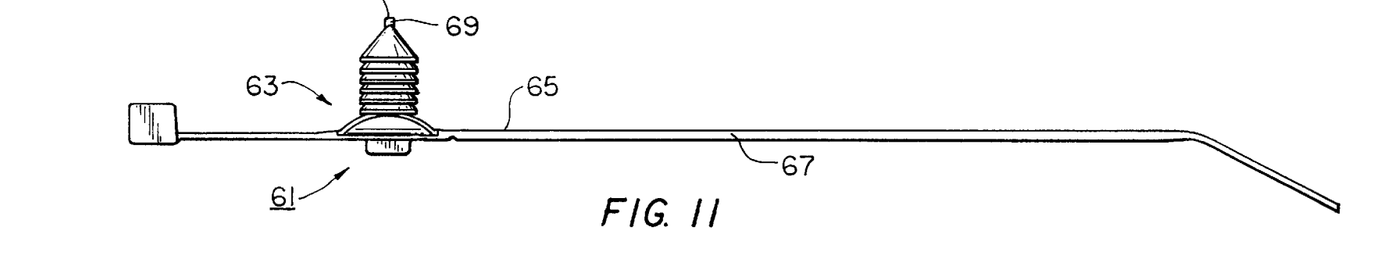
FIG. 11 is a side view of the cable tie shown in FIG. 10.
Figure 12:
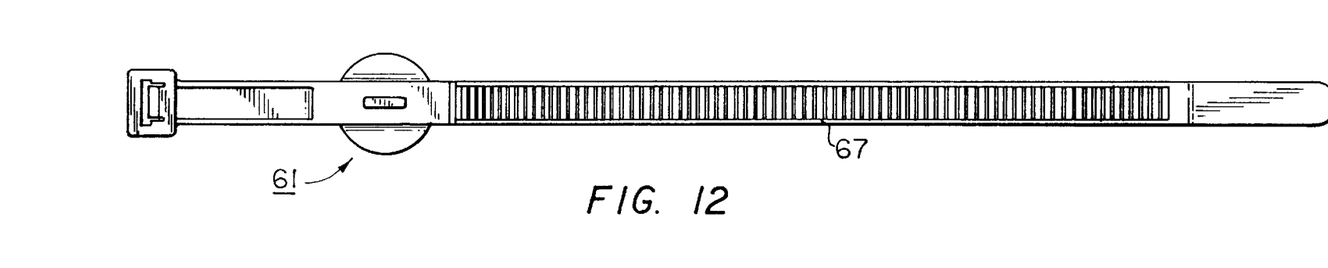
FIG. 12 is a bottom view of the cable tie shown in FIG. 10.
Figure 13:
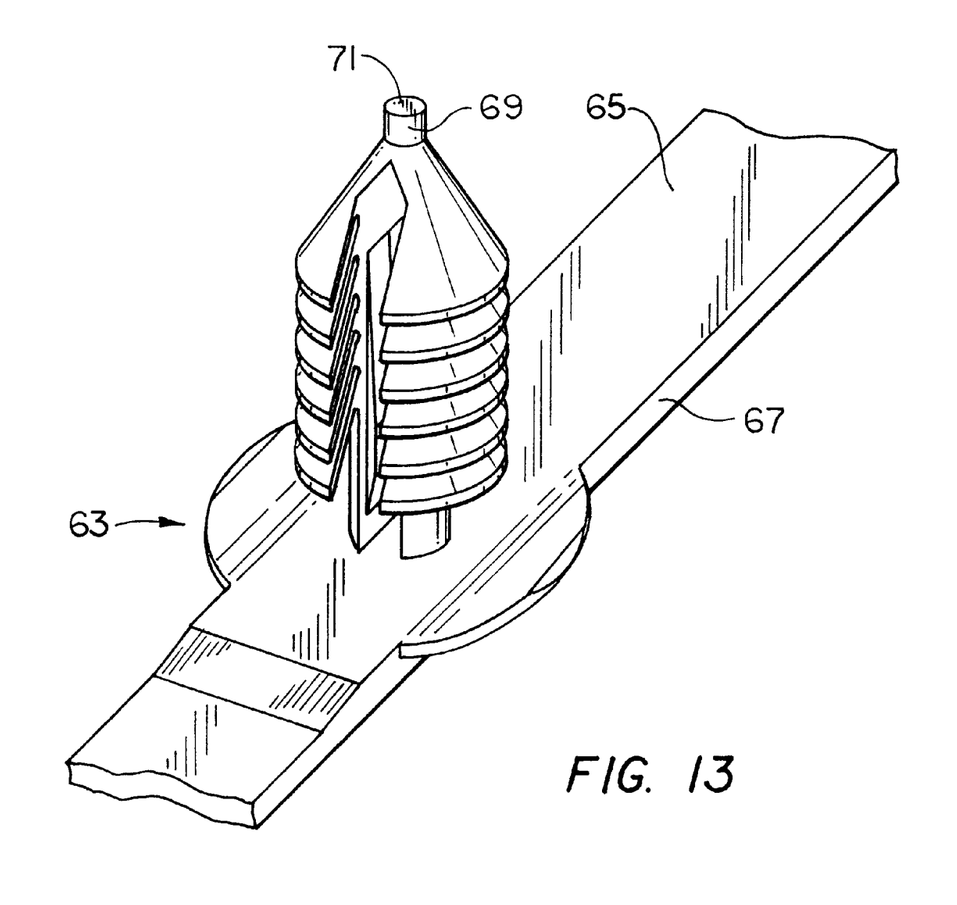
FIG. 13 is an enlarged, fragmentary perspective view of the cable tie shown in FIG. 10.
Figure 14:
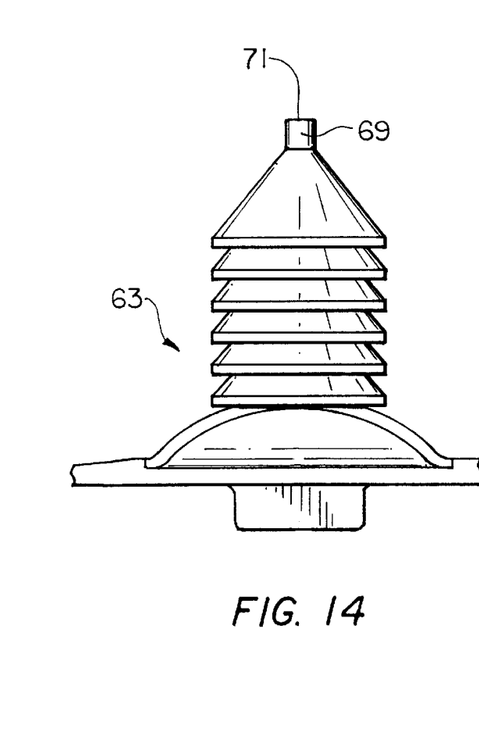
FIG. 14 is an enlarged, fragmentary view of the cable tie shown in FIG. 11.
Figure 15:
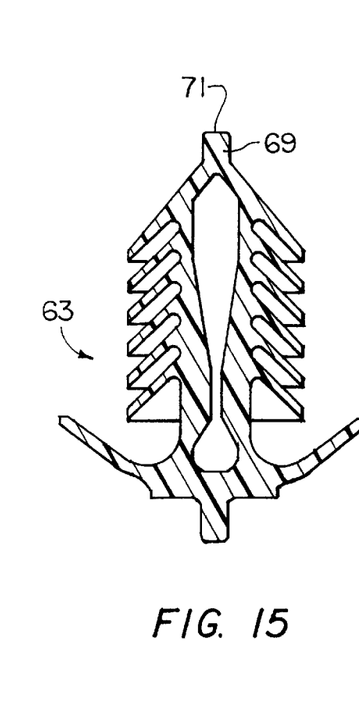
FIG. 15 is an enlarged, sectional left end view of the cable tie shown in FIG. 11.
Figure 16:
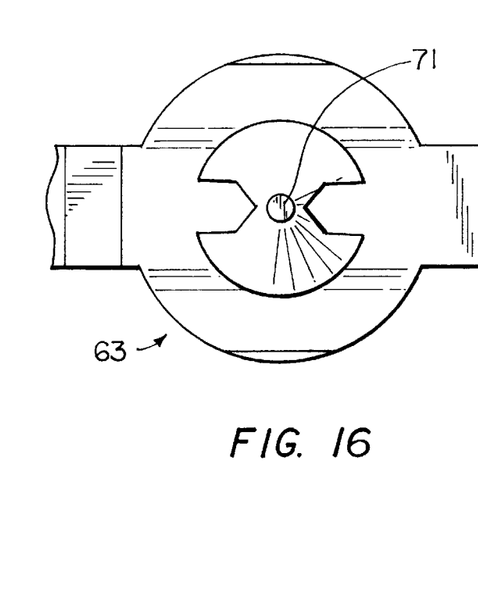
FIG. 16 is an enlarged, fragmentary view of the cable tie shown in FIG. 10.
Figure 17:
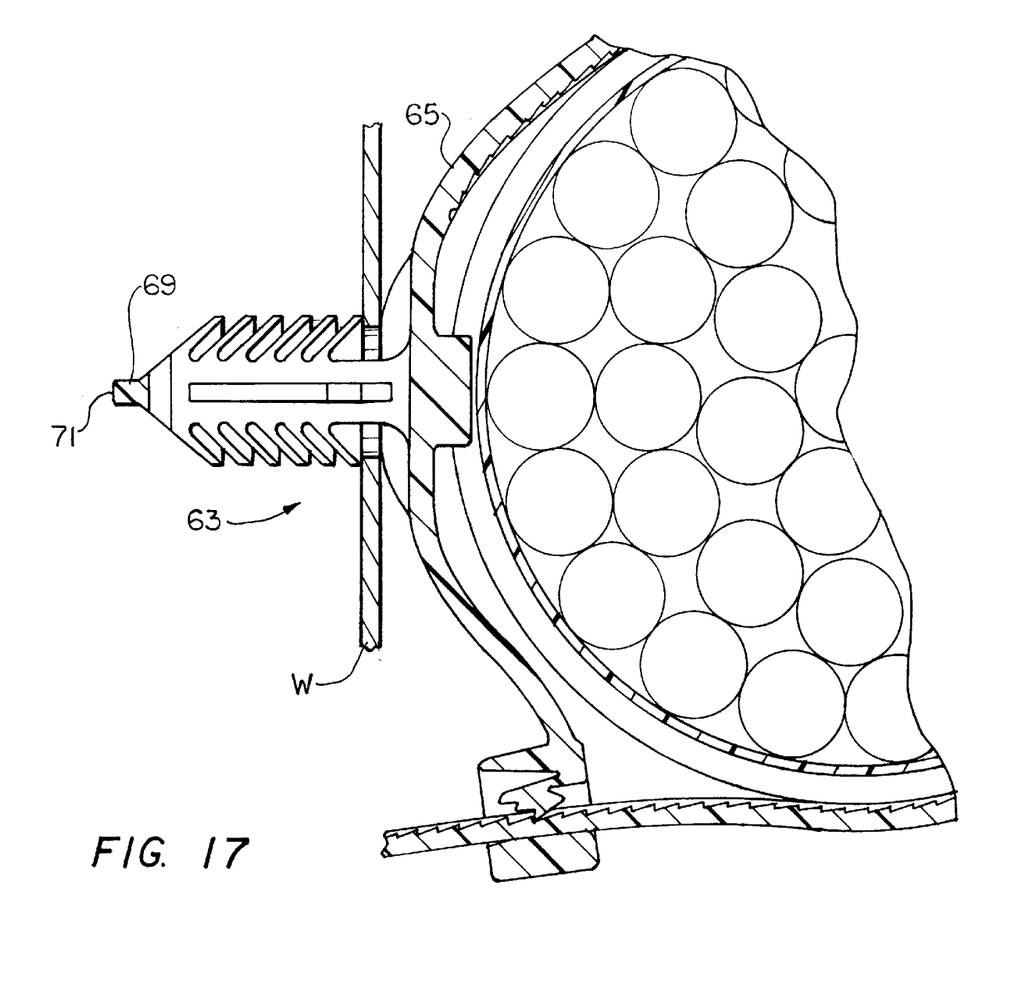
FIG. 17 is a fragmentary section view of the cable tie shown in FIG. 10, the cable tie being shown securing a cable having a plurality of wires enclosed within a convoluted tubular sheath and inserted through an aperture in a thin wall.
Figure 18:
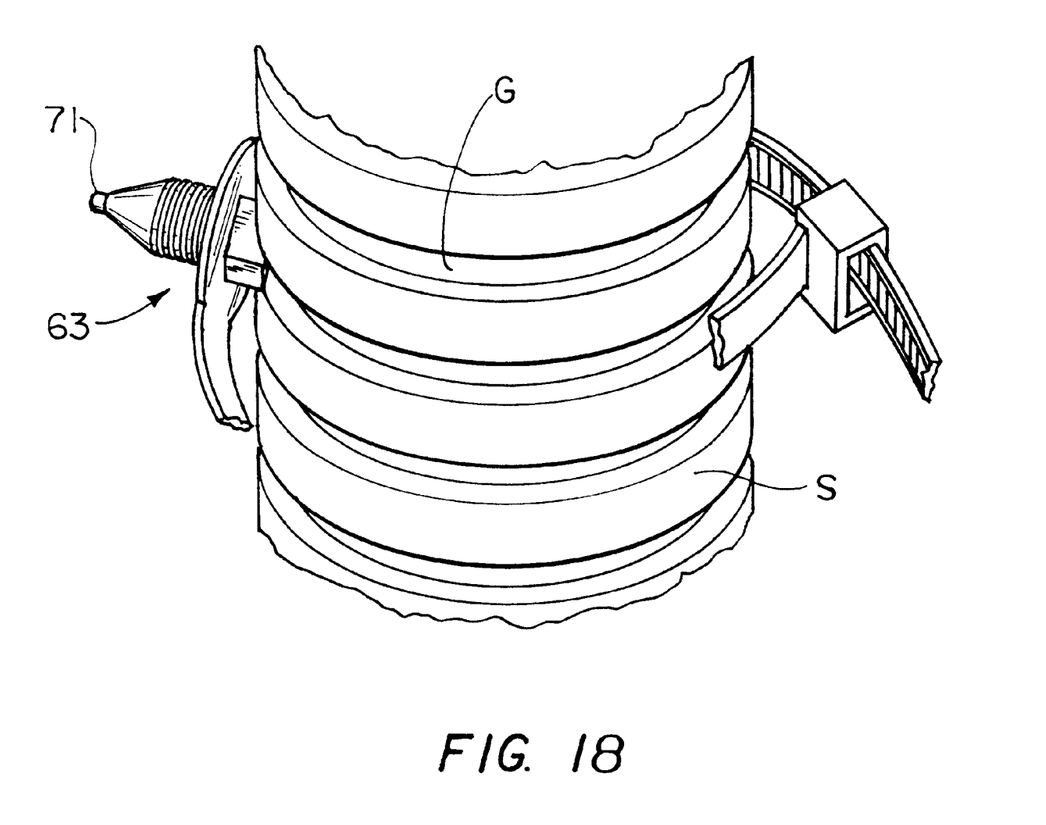
FIG. 18 is a fragmentary perspective view of the cable tie shown in FIG. 17.

In use, as shown in FIG. 8, tie 11 is used to secure a cable C having wires D inside a convoluted tubing sheath S to a thin wall W in the following manner. First, strap 13 is wrapped around cable C with rib 33 engaging an annular groove G in sheath S of cable C. Then, fastener 17 is inserted through aperture A, the edges of aperture A engaging upwardmost flutes 45-1 and cause flutes 45-1 to compress inward with relatively little force due to the construction of ribs 49. Fastener 17 is further inserted until lowermost flutes 45-2 pass through aperture A. After fastener 17 is inserted through aperture A, resilient flutes 45 expand outwardly away from legs 39 and into their initial position with lowermost flutes 45-2 and flange 35 positioned on opposite sides of wall W. Due to the construction of ribs 39, the extraction of fastener 17 from aperture A can only be accomplished by applying a large amount of inward compression on lowermost flutes 45-2. Flange 35 engages wall W and biases lowermost flutes 45-2 in direct and secure contact with wall W, thereby covering aperture A and securing cable C tightly against wall W.

Referring now to FIGS. 10–18, there is shown a second embodiment of a cable tie constructed according to the teachings of the present invention, the cable tie being identified by reference numeral 61. Cable tie 61 differs from cable tie 11 in that cable tie 61 includes a fastener 63 which is integrally formed to the top planar surface 65 of strap 67 perpendicular to the longitudinal axis of strap 67.

Cable tie 61 also differs from cable tie 11 in that cable tie 61 comprises a fastener 63 which includes a cylindrical, protruding common tip 69 which is different in construction from common tip 41 of fastener 17. The differences in construction between tip 41 and tip 69 are based on the different means of ejecting ties 11 and 61 from a construction mold. Common tip 69 is shaped to include a generally circular top surface 71, surface 71 being of a size adequate enough to serve as a surface on which a push pin can eject cable tie 61 from a manufacturing mold.

Although the invention has been described with respect to securing a cable to a mounting surface having an aperture, wherein the cable comprises a plurality of wires inside a sheath of convoluted tubing, it should be understood that the cable tie is not limited to use with this type of cable. Alternatively, the cable tie could be used with other types of cables, such as cables which include a sheath of tubing that is not convoluted, cables which do not include a sheath of tubing and cables which include only one wire.

The embodiments shown in the present invention are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A cable tie for attaching a cable to a mounting surface having an aperture therein, said cable tie comprising:
 (a). an elongated strap having a first end, a second end and a longitudinal axis,
 (b). a locking head integrally formed to the first end of said elongated strap, said locking head being adapted to cooperate with said strap to form a loop around the cable, and
 (c). a fastener coupled to said locking head for securing said cable to the mounting surface, said fastener comprising:
  i. a flange having a top side and a underside, and
  ii. a Christmas tree head adapted to be inserted in the aperture of the mounting surface, said Christmas tree head including a pair of legs integrally formed on and projecting out from the underside of said flange, said legs terminating to form a common tip, said legs being inwardly compressible upon insertion of said Christmas tree head into the aperture, said flange, said legs and said tip together defining a longitudinal slot therebetween, iii. wherein each of said pair of legs includes an integrally formed rib which extends along each of said legs and protrudes into the elongated slot, said ribs being spaced apart, said ribs serving to limit the amount of inward compressibility of said legs.

2. The cable tie as claimed in claim 1 wherein said Christmas tree head further comprises a plurality of flexible flutes which extend radially outward from along the length of each of said pair of legs, said flutes engaging the mounting surface so as to frictionally and releasably secure said fastener to the mounting surface, said flutes being flexible in opposite directions relative to said legs, said plurality of flexible flutes comprising a pair of upwardmost flutes and a pair of lowermost flutes.

3. The cable tie as claimed in claim 2 wherein said plurality of flutes are formed as semi-circular disc protrusions formed on non-opposing sides of the mounting legs.

4. The cable tie as claimed in claim 3 wherein each of said pair of ribs is elongated and is tapered slightly inward from the pair of upwardmost flutes down towards the pair of lowermost flutes so as to permit a high level of inward compressibility of said legs upon initial insertion of said Christmas tree head in the aperture.

5. The cable tie as claimed in claim 4 wherein each of said pair of ribs is elongated and is tapered sharply inward from the pair of lowermost flutes down towards the flange so as to allow a low level of inward compressibility of said legs upon initial extraction of said Christmas tree head from said aperture.

6. The cable tie as claimed in claim 5 wherein said plurality of flutes are long in length and flex inward towards said legs upon insertion of said Christmas tree head into said aperture and flex outward away from said legs extraction of said Christmas tree head from said aperture.

7. The cable tie as claimed in claim 6 wherein said fastener is integrally formed to said locking head in co-axial alignment with the longitudinal axis of said strap.

8. The cable tie as claimed in claim 7 wherein the cross-sectional diameter of said Christmas tree head is in the range of approximately 0.33 inches to 0.34 inches.

9. A cable tie for attaching a cable to a mounting surface having an aperture therein, said cable tie comprising:

(a). an elongated strap having a first end, a second end and a longitudinal axis, (b). a locking head integrally formed to the first end of said elongated strap, said locking head being adapted to cooperate with said strap to form a loop around the cable, and (c). a fastener coupled to said strap for securing said cable to the mounting surface, said fastener comprising:
i. a flange having a top side and a underside, and
ii. a Christmas tree head adapted to be inserted in the aperture of the mounting surface, said Christmas tree head including a pair of legs integrally formed on and projecting out from the underside of said flange, said legs terminating to form a common tip, said legs being inwardly compressible upon insertion of said Christmas tree head into the aperture, said flange, said legs and said tip together defining a longitudinal slot therebetween, iii. wherein each of said pair of legs includes an integrally formed rib which extends along each of said legs and protrudes into the elongated slot, said ribs being spaced apart, said ribs serving to limit the amount of inward compressibility of said legs.

10. The cable tie as claimed in claim 9 wherein said Christmas tree head further comprises a plurality of flexible flutes which extend radially outward from along the length of each of said pair of legs, said flutes engaging the mounting surface so as to frictionally and releasably secure said fastener to the mounting surface, said flutes being flexible in opposite directions relative to said legs, said plurality of flexible flutes comprising a pair of upwardmost flutes and a pair of lowermost flutes.

11. The cable tie as claimed in claim 10 wherein said plurality of flutes are formed as semi-circular disc protrusions formed on non-opposing sides of the mounting legs.

12. The cable tie as claimed in claim 11 wherein each of said pair of ribs is elongated and is tapered slightly inward from the pair of upwardmost flutes down towards the pair of lowermost flutes so as to permit a high level of inward compressibility of said legs upon initial insertion of said Christmas tree head in the aperture.

13. The cable tie as claimed in claim 12 wherein each of said pair of ribs is elongated and is tapered sharply inward from the pair of lowermost flutes down towards the flange so as to allow a low level of inward compressibility of said legs upon initial extraction of said Christmas tree head from said aperture.

14. The cable tie as claimed in claim 13 wherein said plurality of flutes are long in length and flex inward towards said legs upon insertion of said Christmas tree head into said aperture and flex outward away from said legs upon extraction of said Christmas tree head from said aperture.

15. The cable tie as claimed in claim 14 wherein said fastener is integrally formed to said strap in perpendicular alignment with the longitudinal axis of said strap.

16. The cable tie as claimed in claim 15 wherein the cross-sectional diameter of said Christmas tree head is in the range of approximately 0.33 inches to 0.34 inches.

17. A fastener for insertion through an aperture in a mounting surface, said fastener comprising:

(a). a flange having a top side and a underside, and (b). a Christmas tree head adapted to be inserted in the aperture of the mounting surface, said Christmas tree head comprising a pair of legs integrally formed on and projecting out from the underside of said flange, said legs terminating to form a common tip, said legs being inwardly compressible upon insertion of said Christmas tree head into the aperture, said flange, said legs and said tip together defining a longitudinal slot therebetween, wherein each of said pair of legs includes an integrally formed rib which extends along each of said legs and protrudes into the elongated slot, said ribs being spaced apart, said ribs serving to limit the amount of inward compressibility of said legs.

18. A cable tie for attaching a cable to a mounting surface having an aperture therein, said cable tie comprising:

(a). an elongated strap having a first end, a second end and a longitudinal axis, (b). a locking head integrally formed to the first end of said elongated strap, said locking head being adapted to cooperate with said strap to form a loop around the cable, said locking head comprising a rib receivable in an annular groove in a sheath encircling the cable, said rib preventing movement of the cable relative to the strap when said strap is wrapped around the cable, and (c). a fastener coupled to said locking head for securing said cable to the mounting surface, said fastener being integrally formed to said locking head in co-axial alignment with the longitudinal axis of said strap, said fastener comprising:
  i. a flange having a top side and a underside, and
  ii. a Christmas tree head adapted to be inserted in the aperture of the mounting surface, said Christmas tree head including a pair of legs integrally formed on and projecting out from the underside of said flange and a plurality of flexible flutes which extend radially outward from along the length of each of said pair of legs, said plurality of flutes being formed as semi-circular disc protrusions formed on non-opposing sides of the mounting legs, said legs terminating to form a common tip, said legs being inwardly compressible upon insertion of said Christmas tree head into the aperture, said plurality of flutes being long in length so as to flex inward towards said legs upon insertion of said Christmas tree head into said aperture and to flex outward away from said legs upon extraction of said Christmas tree head from said aperture with said flutes engaging the mounting surface so as to frictionally and releasably secure said fastener to the mounting surface, said flutes being flexible in opposite directions relative to said legs, said flange, said legs and said tip together defining a longitudinal slot therebetween, the cross-sectional diameter of said Christmas tree head being in the range of approximately 0.33 inches to 0.34 inches,
  iii. wherein each of said pair of legs includes an integrally formed rib which extends along each of said legs and protrudes into the elongated slot, said ribs being spaced apart, said ribs serving to limit the amount of inward compressibility of said legs, each of said pair of ribs being tapered so as to permit a high level of inward compressibility of said legs upon initial insertion of said Christmas tree head in the aperture and a low level of inward compressibility of said legs upon initial extraction of said Christmas tree head from said aperture.

19. A cable tie for attaching a cable to a mounting surface having an aperture therein, said cable tie comprising:
  (a). an elongated strap having a first end, a second end and a longitudinal axis,
  (b). a locking head integrally formed to the first end of said elongated strap, said locking head being adapted to cooperate with said strap to form a loop around the cable, said locking head comprising a rib receivable in an annular groove in a sheath encircling the cable, said rib preventing movement of the cable relative to the strap when said strap is wrapped around the cable, and
  (c). a fastener coupled to said strap for securing said cable to the mounting surface, said fastener being integrally formed to said strap in perpendicular alignment with the longitudinal axis of said strap, said fastener comprising:
    i. a flange having a top side and a underside, and
    ii. a Christmas tree head adapted to be inserted in the aperture of the mounting surface, said Christmas tree head including a pair of legs integrally formed on and projecting out from the underside of said flange and a plurality of flexible flutes which extend radially outward from along the length of each of said pair of legs, said plurality of flutes being formed as semi-circular disc protrusions formed on non-opposing sides of the mounting legs, said legs terminating to form a common tip, said legs being inwardly compressible upon insertion of said Christmas tree head into the aperture, said plurality of flutes being long in length so as to flex inward towards said legs upon insertion of said Christmas tree head into said aperture and to flex outward away from said legs upon extraction of said Christmas tree head from said aperture with said flutes engaging the mounting surface so as to frictionally and releasably secure said fastener to the mounting surface, said flutes being flexible in opposite directions relative to said legs, said flange, said legs and said tip together defining a longitudinal slot therebetween, the cross-sectional diameter of said Christmas tree head being in the range of approximately 0.33 inches to 0.34 inches,
    iii. wherein each of said pair of legs includes an integrally formed rib which extends along each of said legs and protrudes into the elongated slot, said ribs being spaced apart, said ribs serving to limit the amount of inward compressibility of said legs, each of said pair of ribs being tapered so as to permit a high level of inward compressibility of said legs upon initial insertion of said Christmas tree head in the aperture and a low level of inward compressibility of said legs upon initial extraction of said Christmas tree head from said aperture.

* * * * *